(12) United States Patent
Kozar et al.

(10) Patent No.: US 10,766,195 B2
(45) Date of Patent: Sep. 8, 2020

(54) ADDITIVE MANUFACTURING FIBER COMPOSITES AND RELATED SYSTEMS AND METHODS

(71) Applicant: The Boeing Company, Chicago, IL (US)

(72) Inventors: Michael Patrick Kozar, Mercer Island, WA (US); Mark Stewart Wilenski, Mercer Island, WA (US); Samuel F. Harrison, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 306 days.

(21) Appl. No.: 15/726,283

(22) Filed: Oct. 5, 2017

(65) Prior Publication Data

US 2019/0105832 A1 Apr. 11, 2019

(51) Int. Cl.
*B29C 64/291* (2017.01)
*B33Y 10/00* (2015.01)
(Continued)

(52) U.S. Cl.
CPC ........ *B29C 64/291* (2017.08); *B29C 35/0805* (2013.01); *B29C 64/118* (2017.08);
(Continued)

(58) Field of Classification Search
CPC .................. B29C 2035/0844; B29C 35/0272
See application file for complete search history.

(56) References Cited

U.S. PATENT DOCUMENTS

| | | | |
|---|---|---|---|
| 3,971,711 A * | 7/1976 | Araki | ..................... B29C 71/04 522/7 |
| 5,936,861 A | 8/1999 | Jang et al. | |

(Continued)

FOREIGN PATENT DOCUMENTS

| | | |
|---|---|---|
| WO | WO 2006/020685 | 2/2006 |
| WO | WO 2012/039956 | 3/2012 |

(Continued)

OTHER PUBLICATIONS

European Patent Office, Extended European search report for related European Application No. 18183823, dated Jan. 22, 2019.
(Continued)

*Primary Examiner* — Benjamin A Schiffman
(74) *Attorney, Agent, or Firm* — Dascenzo Intellectual Property Law, P.C.

(57) ABSTRACT

Additive manufacturing fiber composites comprise a bundle of elongate fibers and a matrix material that holds or encompasses the elongate fibers of the additive manufacturing fiber tow. The matrix material includes an energy-emissive dopant that emits a curing energy in response to receiving an activating energy. The curing energy effects curing of the solidifiable matrix material so that it solidifies to a rigid or semi-rigid matrix material. Methods of additively manufacturing an article include dispensing an additive manufacturing fiber tow, a solidifiable matrix material, and an energy-emissive dopant to form a solidifiable composite, and applying the activating energy to the energy-emissive dopant to activate the energy-emissive dopant to emit the curing energy. Systems to additively manufacturing an article may be configured to employ such additive manufacturing fiber composites and/or methods.

20 Claims, 9 Drawing Sheets

(51) Int. Cl.

| | |
|---|---|
| B29C 64/118 | (2017.01) |
| B29C 64/129 | (2017.01) |
| B29C 35/08 | (2006.01) |
| B29C 64/295 | (2017.01) |
| B29C 64/188 | (2017.01) |
| B33Y 99/00 | (2015.01) |
| B33Y 30/00 | (2015.01) |
| B29C 64/209 | (2017.01) |
| B29C 64/165 | (2017.01) |
| B33Y 70/00 | (2020.01) |
| B29B 15/14 | (2006.01) |
| B29K 101/12 | (2006.01) |
| B29K 105/08 | (2006.01) |

(52) U.S. Cl.
CPC ............ *B29C 64/129* (2017.08); *B33Y 10/00* (2014.12); *B29B 15/14* (2013.01); *B29C 64/165* (2017.08); *B29C 64/188* (2017.08); *B29C 64/209* (2017.08); *B29C 64/295* (2017.08); *B29C 2035/085* (2013.01); *B29C 2035/0844* (2013.01); *B29K 2101/12* (2013.01); *B29K 2105/08* (2013.01); *B33Y 30/00* (2014.12); *B33Y 70/00* (2014.12); *B33Y 99/00* (2014.12)

(56) References Cited

U.S. PATENT DOCUMENTS

| | | | |
|---|---|---|---|
| 6,214,279 | B1 | 4/2001 | Yang et al. |
| 6,362,388 | B1 | 3/2002 | Lucas |
| 6,899,777 | B2 | 5/2005 | Vaidyanathan et al. |
| 8,133,537 | B2 | 3/2012 | Nair et al. |
| 8,801,990 | B2 | 8/2014 | Mikulak et al. |
| 8,920,697 | B2 | 12/2014 | Mikulak et al. |
| 2003/0044593 | A1 | 3/2003 | Vaidyanathan et al. |
| 2005/0104241 | A1 | 5/2005 | Kritchman et al. |
| 2009/0095410 | A1 | 4/2009 | Oldani |
| 2010/0190005 | A1 | 7/2010 | Nair et al. |
| 2014/0061974 | A1 | 3/2014 | Tyler |
| 2014/0263534 | A1 | 9/2014 | Post et al. |
| 2014/0265040 | A1 | 9/2014 | Batchelder |
| 2015/0008422 | A1 | 1/2015 | Lee et al. |
| 2015/0298366 | A1* | 10/2015 | Richter .................. B29C 35/08 264/488 |
| 2018/0126609 | A1* | 5/2018 | Kamihara ............... B29C 70/88 |
| 2018/0361618 | A1* | 12/2018 | Abbott, Jr. ............ B29C 64/112 |

FOREIGN PATENT DOCUMENTS

| | | |
|---|---|---|
| WO | WO 2013/086577 | 6/2013 |
| WO | WO 2014/153535 | 9/2014 |
| WO | WO 2015/009938 | 1/2015 |
| WO | WO 2015/118533 | 8/2015 |
| WO | WO 2016/053681 | 4/2016 |

OTHER PUBLICATIONS

U.S. Appl. No. 15/610,466, filed May 31, 2017, Wilenski et al.
U.S. Appl. No. 15/367,021, filed Dec. 1, 2016, Wilenski et al.
U.S. Appl. No. 15/356,420, filed Nov. 18, 2016, Wilenski et al.
U.S. Appl. No. 15/346,537, filed Nov. 8, 2016, Wilenski et al.
U.S. Appl. No. 15/345,189, filed Nov. 7, 2016, Wilenski, et al.
U.S. Appl. No. 15/063,400, filed Mar. 7, 2016, Evans et al.
Website screenshots showing Stratonics ThermaViz® Sensor Systems, from Stratonics.com website, downloaded on Nov. 4, 2016.
Printout of online article, "Improving Additive Manufacturing (3D Printing) using Infrared Imaging," Aug. 10, 2016, from AZoM.com website, downloaded on Nov. 4, 2016.
U.S. Appl. No. 14/995,507, filed Jan. 14, 2016, Evans et al.
U.S. Appl. No. 14/931,573, filed Nov. 3, 2015, Evans et al.
U.S. Appl. No. 14/920,748, filed Oct. 22, 2015, Evans et al.
U.S. Appl. No. 14/841,470, filed Aug. 31, 2015, Evans et al.
U.S. Appl. No. 14/841,423, filed Aug. 31, 2015, Evans et al.
Website screenshots of online article, Evan Milberg, "Arevo Labs Introduces First Robot-Based Platform for 3-D Printing Composite Parts," Nov. 23, 2015, from CompositesManufacturingMagazine. com website, downloaded on Jan. 12, 2016.
Printout of online article, Jeff Sloan, "Arevo Labs launches 3D printing platform for composite parts fabrication," Nov. 16, 2015, from CompositesWorld.com website, downloaded on Dec. 9, 2015.
Website screenshots of online how-to article, "Fiber Composite 3D Printing (The Bug)," from Instructables.com website, downloaded on Aug. 20, 2015.
Printout of website showing FormLabs, Frequently Asked Questions (re the Form1+ SLA 3D Printer), from FormLabs.com website, downloaded on Aug. 19, 2015.
Website screenshots showing the Form 1+ SLA 3D Printer, from FormLabs.com website, downloaded on Aug. 20, 2015.
Printout of online article "Carbon3D Introduces Breakthrough CLIP Technology for Layerless 3D Printing, 25-100x Faster," Mar. 17, 2015, from 3Ders.org website, downloaded on Aug. 19, 2015.
Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.
Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing the Mark One Composite 3D Printer, from MarkForged.com website, downloaded on Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Printout of online article "Automated Fiber Placement," from AutomatedDynamics.com website, downloaded on Aug. 19, 2015.
User Manual for 3Doodler 2.0, from The3Doodler.com website, downloaded on Aug. 19, 2015.
Website screenshots showing "Fiber Composite 3D Printing," from MakeZine.com website, downloaded on Jun. 2, 2015.
Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.
Hu et al., "Sensing, Modeling and Control for Laser-Based Additive Manufacturing," International Journal of Machine Tools and Manufacture, No. 43, pp. 51-60, 2003.
Gupta et al., "Dual Curing of Carbon Fiber Reinforced Photoresins for Rapid Prototyping," Polymer Composites, vol. 23, No. 6, pp. 1162-1170, Dec. 2002.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Ogale et al., "3-Dimensional Composite Photolithography," Proceedings of the American Society for Composites, Eleventh Technical Conference, pp. 822-828, Oct. 7-9, 1996.
Ogale et al., "Fabrication of Fiber Reinforced Plates with Curvilinear Layout by 3-D Photolithography," 26$^{th}$ International SAMPE Technical Conference, vol. 26, pp. 54-61, Oct. 17-20, 1994.

* cited by examiner

ADDITIVE MANUFACTURING FIBER COMPOSITES AND RELATED SYSTEMS AND METHODS

FIELD

The present disclosure relates to fiber composites for additive manufacturing, and related methods and systems.

BACKGROUND

A printing process may use a feedstock material, dispensed from a print head, to additively manufacture an article with successive layers or courses of the feedstock material. The feedstock material may comprise a polymer and reinforcing fibers, such as carbon fibers, that are opaque to visible and ultra-violet light. When the polymer in the feedstock material is a photopolymer, a source of curing energy may be directed at the feedstock material, dispensed by the print head, to solidify the feedstock material. However, when the reinforcing fibers are opaque to the curing energy, they cast shadows and prevent the curing energy, originating directly from the source of curing energy, from irradiating and curing the photopolymer in the shadows.

SUMMARY

Additive manufacturing fiber composites and related systems and methods are disclosed.

Additive manufacturing fiber composites comprise a bundle of elongate fibers and a matrix material, with an energy-emissive dopant. The matrix material holds or encompasses the elongate fibers of the additive manufacturing fiber tow. The energy-emissive dopant emits a curing energy in response to receiving an activating energy, and the curing energy effects curing of the solidifiable matrix material so that it solidifies to a rigid or semi-rigid matrix material. The activating energy may penetrate or pass-through the elongate fibers to activate the energy-emissive dopant to provide curing of the matrix material throughout the additive manufacturing fiber composite.

Methods of additively manufacturing an article include dispensing an additive manufacturing fiber tow, a solidifiable matrix material, and an energy-emissive dopant. The method includes applying the activating energy to the energy-emissive dopant to activate the energy-emissive dopant to emit the curing energy.

Systems to additively manufacture an article include a supply of additive manufacturing fiber tow, a supply of matrix material with energy-emissive dopant, a composite dispenser to dispense the additive manufacturing fiber tow with the solidifiable matrix material, and an activating energy source that applies activating energy to the energy-emissive dopant to activate the energy-emissive dopant to emit the curing energy to effect curing of the matrix material.

DESCRIPTION

Additive manufacturing fiber composites and related systems and methods are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
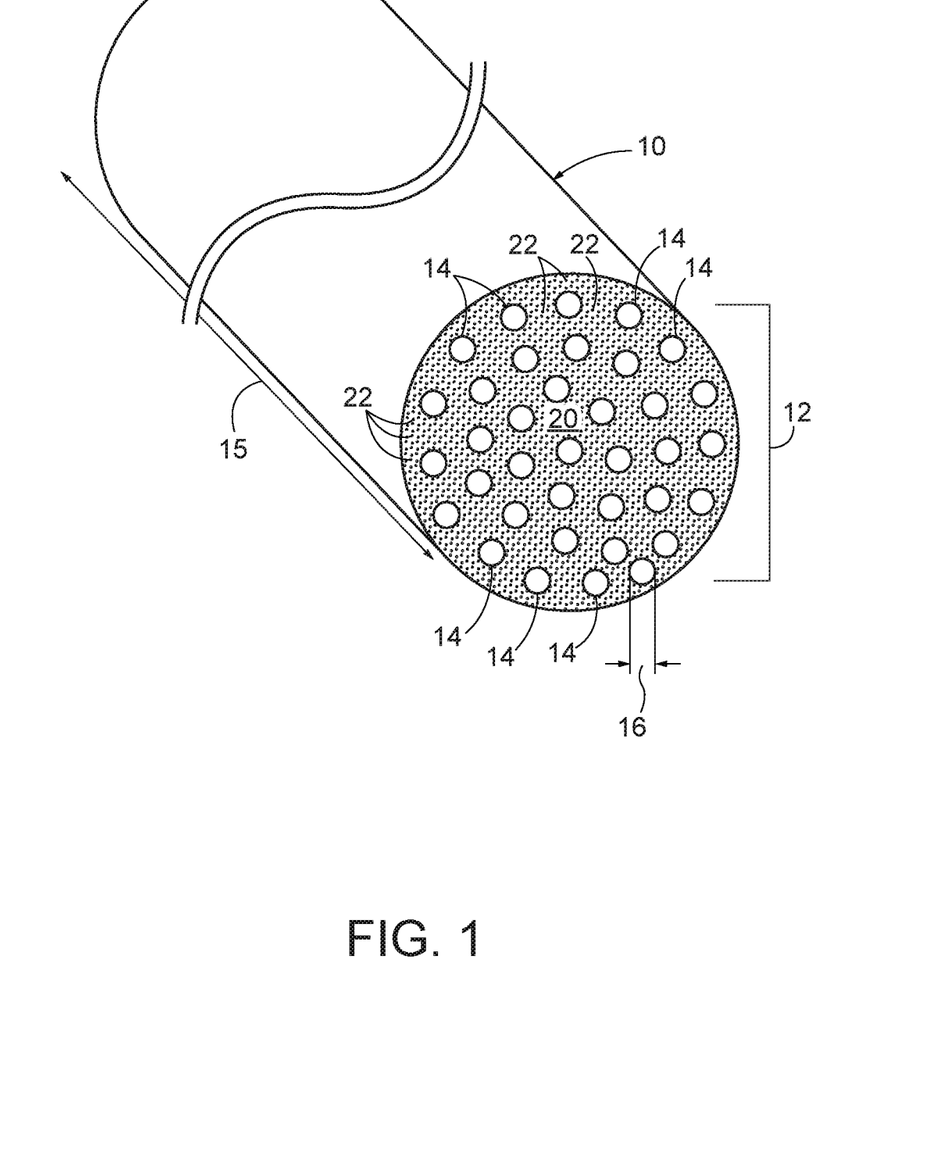
FIG. 1 is a schematic view of an elongate additive manufacturing fiber composite.

As schematically illustrated in FIG. 1, an elongate additive manufacturing fiber composite 10 is shown. Elongate additive manufacturing fiber composite 10 includes an additive manufacturing fiber tow 12 of multiple elongate fibers 14. Elongate additive manufacturing fiber composite 10 further includes a matrix material 20, with an energy-emissive dopant 22. Matrix material 20 holds or encompasses elongate fibers 14 of additive manufacturing fiber tow 12.

The elongate fibers 14 of additive manufacturing fiber tow 12 typically, or at least in their initially manufactured form, have lengths 15 that are significantly greater than their diameters 16. (Diameter 16 herein refers to a sectional, lateral dimension through a center of a body and does not imply or require that the body have a circular cross section. Elongate fibers 14 have cross sections that may be circular or non-circular.) As illustrative, non-exclusive examples, the elongate fibers 14 each may have lengths that are at least 10, at least 100, at least 1,000, at least 10,000, at least 100,000, or at least 1,000,000 times greater than diameter 16. In accordance with these examples, the elongate fibers 14 may be referred to as being continuous or chopped. Elongate additive manufacturing fiber composite 10 is configured for use as a feedstock, or at least as a component of a feedstock, for an additive manufacturing system, such as may be referred to as a 3-D printer or a fused filament fabrication (FFF) system, for example. Elongate fibers 14 may include, comprise, or be formed of one or more of carbon fibers, glass fibers, aramid fibers, boron fibers, silicon-carbide fibers, ceramic fibers, optical fibers, fiber bundles, fiber weaves, fiber braids, wires, metal wires, conductive wire, and wire bundles.

Matrix material 20 may take the form of or include one or more of a polymer, a resin, a thermoset, and/or a photopolymer. As used herein, a photopolymer is a polymer that is configured to be cured in the presence of light, such as one or more of ultraviolet light, visible-light, or infrared-light, for example. Matrix material 20 may initially have a solidifiable state and may subsequently have a solidified state. In its solidifiable state, matrix material 20 is in a liquid phase or in a similar flowable state (e.g., not in a rigidly solid form) that may be intermixed with and/or applied to encompass elongate fibers 14 to create the elongate additive manufacturing fiber composite 10. The elongate additive manufacturing fiber composite 10 may include the matrix material 20 in the solidifiable state as a pre-impregnated, or prepreg, composite stock. In its solidified state, matrix material 20 is in a rigidly, or semi-rigidly, non-flowable state.

In some examples, matrix material 20 may be curable so as to transition from the solidifiable state to the solidified state as a result of cross-linking of polymer chains, such as responsive to an application of a curing energy. Energy-emissive dopant 22 may include or be configured as a liquid, a gas, and/or a solid that is within matrix material 20 and that emits a curing energy in response to receiving an activating energy, which may be different from the curing energy. The curing energy emitted by energy-emissive dopant 22 effects curing of matrix material 20 to transition from the solidifable state to the solidified state, as described below in greater detail. As a solid, energy-emissive dopant 22 may be and/or include one or more of particles (e.g., nanoparticles), elongates, threads, and/or fibers. In some examples in which elongate fibers 14 include carbon fibers, energy-emissive dopant 22 may be and/or include particles (e.g., nanoparticles).

Generally, matrix material 20 may transition from the solidifiable state to the solidified state by applying a curing energy that may comprise one or more of heat, ultraviolet light, visible light, or infrared light, for example. The curing energy may be applied by a curing energy source (e.g., light or heat source), and/or may be applied by energy-emissive dopant 22 emitting the curing energy in response to receiving the activating energy. In some examples, elongate fibers 14 of additive manufacturing fiber tow 12 may block or shadow illuminating curing energy from a curing energy source and prevent the curing energy from reaching at least some of the matrix material 20.

In examples, therefore, matrix material 20 may be transitioned from the solidifiable state to the solidified state by applying an activating energy that activates energy-emissive dopant 22 throughout matrix material 20 so that energy-emissive dopant 22 emits the curing energy and effects curing of matrix material 20. In some examples, the activating energy may be a penetrating and/or an ionizing activating energy (e.g., x-rays, gamma rays, electron-beams, sub-atomic particles, etc.) or may be a non-ionizing activating energy (e.g., ultraviolet (UV), visible, infrared (IR), radio frequency (RF), microwaves, magnetic or electric fields, etc.). In some examples, a penetrating and/or an ionizing activating energy may penetrate or pass through elongate fibers 14 to reach matrix material 20 that could otherwise be obscured by the elongate fibers 14. In addition to reaching matrix material 20 that could otherwise be obscured or shadowed by the elongate fibers 14, such activating energy activates energy-emissive dopant 22 throughout matrix material 20 so that energy-emissive dopant 22 emits the curing energy and effects curing of matrix material 20 throughout elongate additive manufacturing fiber composite 10. In examples, the activating energy may also effect curing of matrix material 20 directly upon illuminating or impinging upon the matrix material 20.

Table 1 lists example materials that may be employed as and/or included in energy-emissive dopant 22, together with corresponding activating energies (as wavelengths in nanometers (nm) or energy type), curing energies that are emitted (as wavelengths in nm, or energy type), and persistence times (nanoseconds (nS)) for materials that may continue to emit curing energy subsequent to activation energy being applied, as described below in greater detail. One or more of the dopants of Table 1 may include and/or be configured as nanoparticles, which may be generally of a size of 1 nm to 100 nm.

TABLE 1

| Energy-Emissive Dopant | Excitation or Activating Energy | Emission | Persistence Time |
|---|---|---|---|
| Au | 260 nm | 3500 nm | |
| $NaYF_4$(Er/Tm,Yb)/$NaYF_4$ (coreshell configuration) | 980 nm | 365 nm | |
| Iron Oxide Nanoparticles | Alternating Current Magnetic Field | Thermal | |
| Aluminum Nanorods (e.g., plasmonic nanostructures or nanoantennas) | Electron-Beam | 260 nm-600 nm | |
| Au NP (nanoparticles) | Radio Frequency | Thermal | |
| $BaF_2$ | X-Ray | 180-220 nm | |
| $YAlO_3$:Ce | X-Ray | 360 nm | |
| $LuAlO_3$:Ce | X-Ray | 365 nm | |
| ZnO:Ga | X-ray | 390 nm | |
| $SrHfO_3$:Ce | X-Ray | 390 nm | 40 ns |
| $Lu_2SiO_5$:Ce | X-Ray | 390 nm | |
| $YTaO_4$:Nb | X-Ray | 410 nm | 2,000 ns |
| PbWO4 | X-Ray | 410 nm | |
| CaWO4 | X-Ray | 420 nm | 6,000 ns |
| $K_2LaI_5$:Ce | X-Ray | 420 nm | |
| LaOBr:Tb | X-Ray | 425 nm | 1,000,000 ns |
| $Li_2MgGeO_4$:$Mn^{2+}$ | 254 nm | 532 nm | $>1.8 \times 10^{13}$ ns (>5 hours) |

The example energy-emissive dopant materials listed in Table 1 are illustrative. It will be appreciated that many other materials, which may employ any of the listed activating energies or energy types, may be employed as and/or included in energy-emissive dopant 22, and may or may not include persistence times within the range of 40 ns-5 hours. Moreover, wavelengths generally in the range of 10 nm to about 450 nm may be considered ultraviolet (UV) light, which may correspond to a curing energy in some examples.

Figure 2:
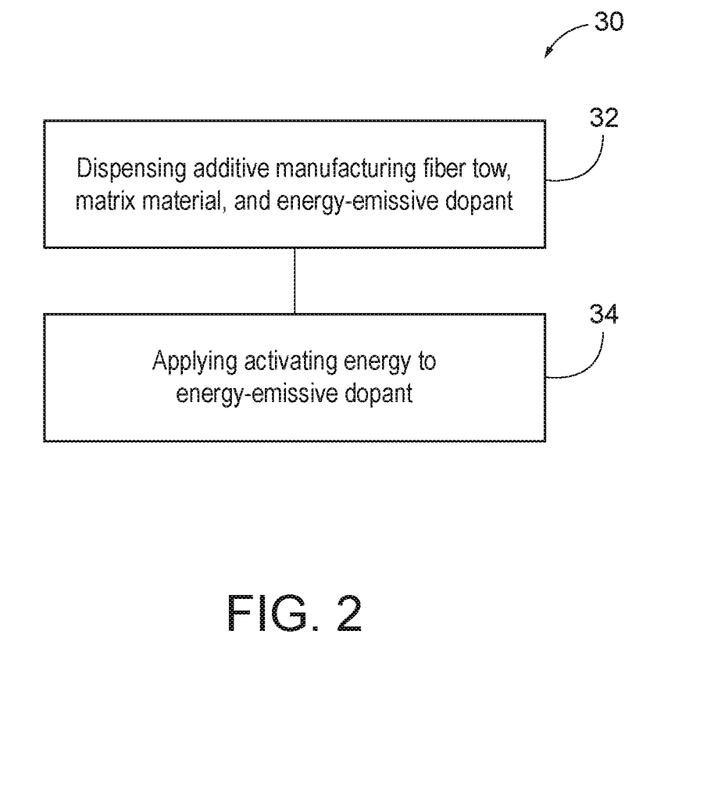
FIG. 2 includes a flowchart illustrating an example additive manufacturing method.
Figure 3:
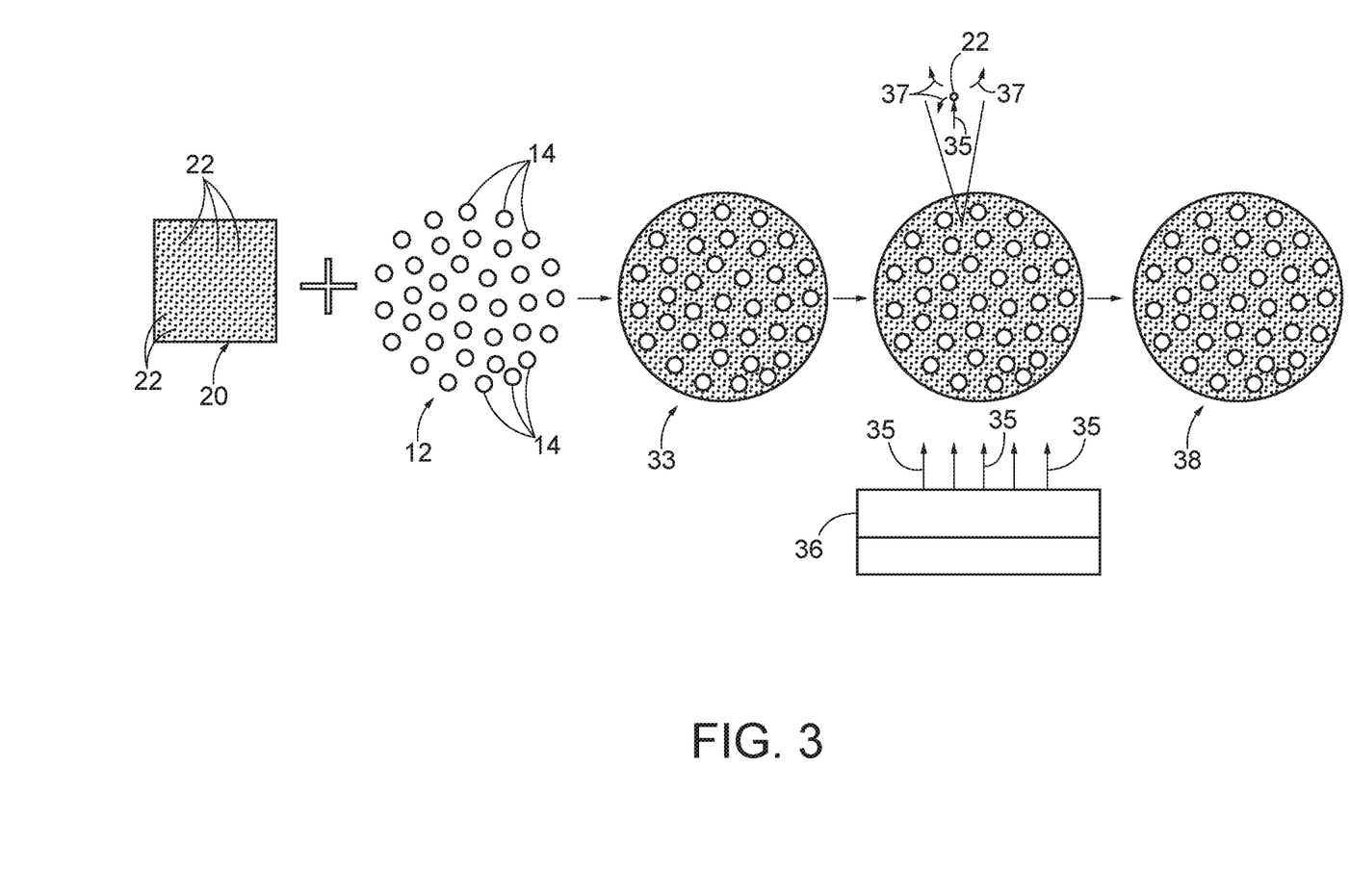
FIG. 3 includes illustrations corresponding to example operations of the method of FIG. 2.

FIG. 2 includes a flowchart illustrating an example additive manufacturing method 30, and FIG. 3 includes an illustration corresponding and/or relating to example operations of method 30.

Method 30 includes dispensing 32 an additive manufacturing fiber tow, a matrix material, and an energy-emissive dopant. As illustrated in FIG. 3, for example, the additive manufacturing fiber tow may include additive manufacturing fiber tow 12, and the matrix material and energy-emissive dopant may include matrix material 20 with energy-emissive dopant 22, which together may form a solidifiable elongate additive manufacturing fiber composite 33. For example, solidifiable elongate additive manufacturing fiber composite 33 may correspond to elongate additive manufacturing fiber composite 10 with matrix material 20 in a solidifiable state. Method 30 includes applying 34 activating energy to the energy-emissive dopant to activate the energy-emissive dopant to emit the curing energy. Applying 34 activating energy to the energy-emissive dopant may include applying a penetrating and/or an ionizing activating energy (e.g., x-rays, gamma rays, etc.). As illustrated in FIG. 3, for example, activating energy 35 may be applied by an activating energy source 36 and, as indicated in an illustration enlargement, may activate energy-emissive dopant 22 to emit curing energy 37 to provide solidified elongate additive manufacturing fiber composite 38. For example, solidified elongate additive manufacturing fiber composite 38 may correspond to elongate additive manufacturing fiber composite 10 with matrix material 20 in a solidified state.

Dispensing 32 an additive manufacturing fiber tow, a matrix material, and an energy-emissive dopant may include dispensing additive manufacturing fiber tow, matrix material, and energy-emissive dopant separately, concurrently, and/or in any combination, sub-combination, or sequence. In FIG. 3, for example, matrix material 20 is illustrated as including energy-emissive dopant 22 when dispensed with additive manufacturing fiber tow 12. In other examples, matrix material 20 and energy-emissive dopant 22 may be dispensed separately. Also, applying 34 activating energy 35 to the energy-emissive dopant 22 to activate the energy-emissive dopant 22 to emit the curing energy 37 may occur at any time (e.g., before, during, and/or after) with regard to dispensing 32 of an additive manufacturing fiber tow, a matrix material, and an energy-emissive dopant.

Figure 4:
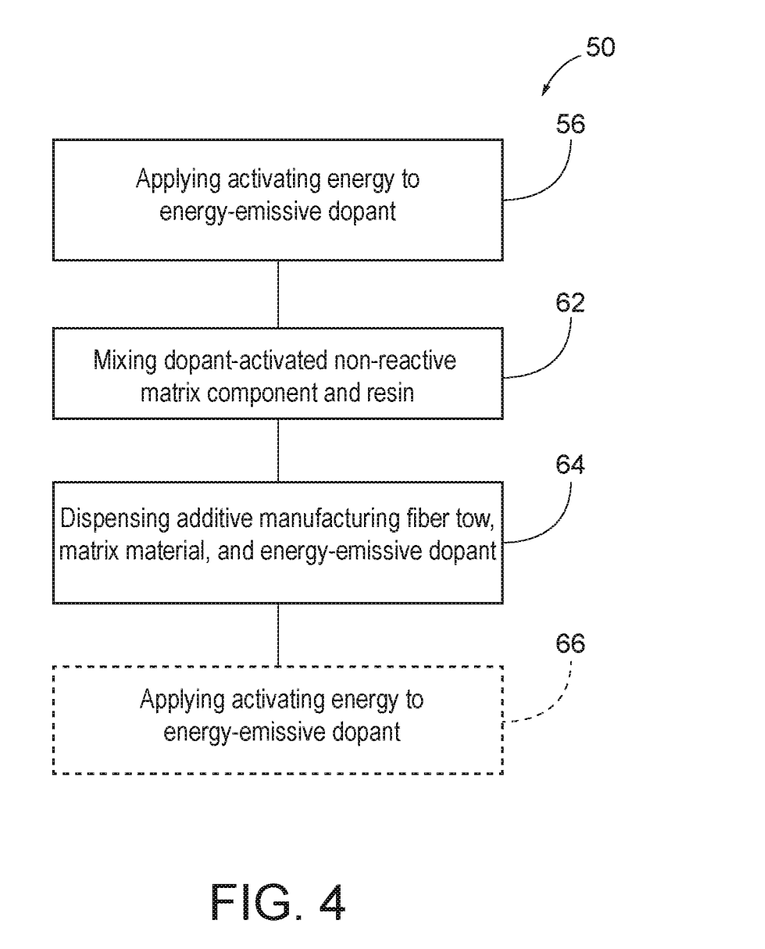
FIG. 4 includes a flowchart illustrating another example additive manufacturing method.
Figure 5:
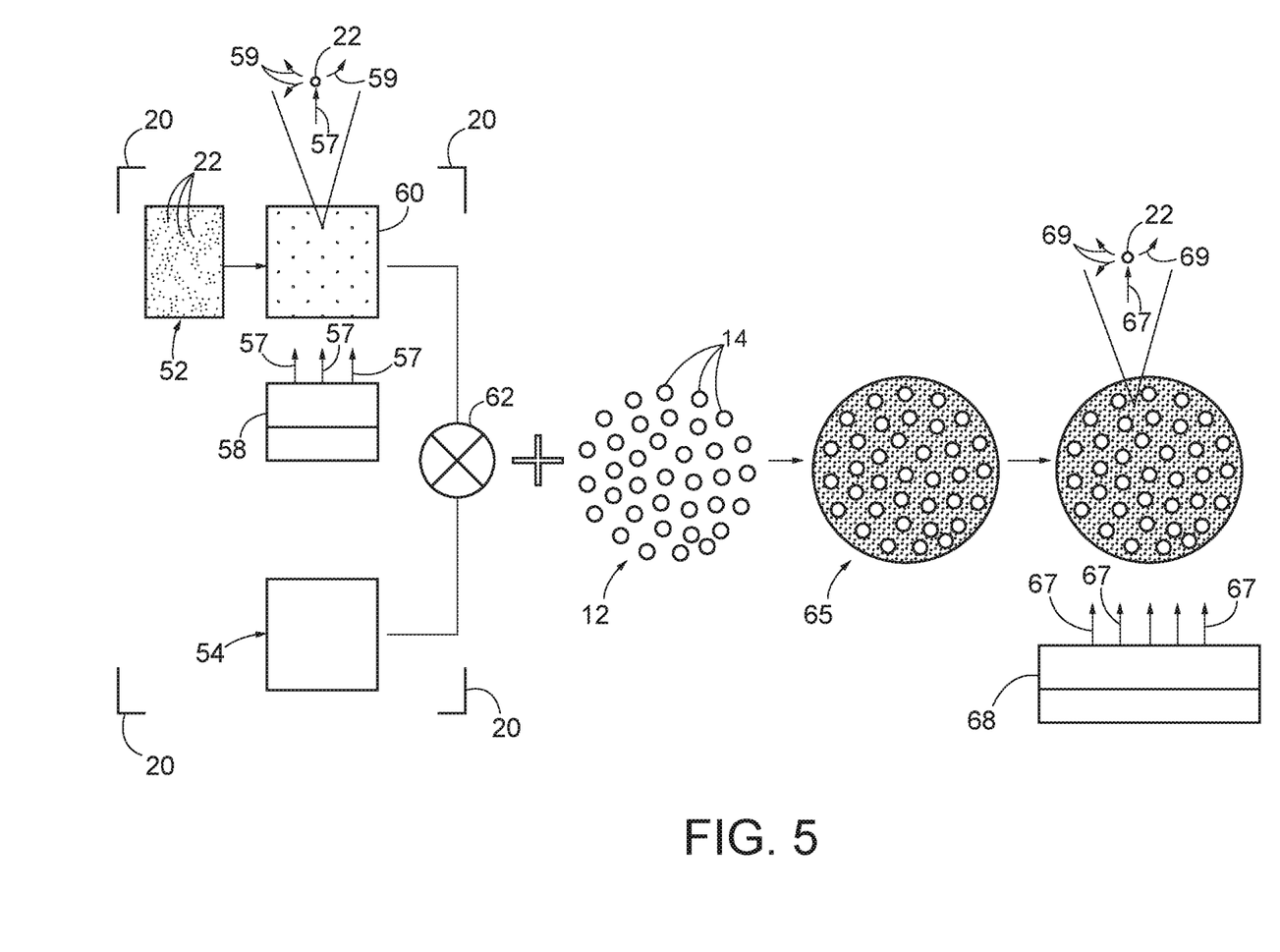
FIG. 5 includes illustrations corresponding and/or relating to example operations of the method of FIG. 4.

FIG. 4 includes a flowchart illustrating an example additive manufacturing method 50, as a particular implementation of additive manufacturing method 30, and FIG. 5 includes illustrations corresponding and/or relating to example operations of method 50. FIG. 5 illustrates an example of matrix material 20 that includes a non-reactive matrix component 52 and a resin 54 that together comprise matrix material 20. In the example of FIGS. 4 and 5, non-reactive matrix component 52 includes energy-emissive dopant 22. It will be appreciated, however, that in other examples, energy-emissive dopant 22 may be included in resin 54, in addition or as an alternative to energy-emissive dopant 22 being included in non-reactive matrix component 52.

Non-reactive matrix component 52, which may include a catalyst in some examples, is a component of matrix material 20 and is generally not reactive to the activating energy 35 or the curing energy 37. As a result, non-reactive matrix component 52 may carry energy-emissive dopant 22 without reacting to (e.g., solidifying) in response to exposure to the activating energy 35 or the curing energy 37. Moreover, non-reactive matrix component 52 and energy-emissive dopant 22 together may form a larger proportion of matrix material 20 than would energy-emissive dopant 22 alone. As a result, energy-emissive dopant 22 included with non-reactive matrix component 52 may facilitate and/or increase the accuracy of measuring, mixing, and/or distributing energy-emissive dopant 22 in matrix material 20.

Method 50 includes applying 56 activating energy to the energy-emissive dopant (e.g., within the non-reactive matrix component 52) to activate the energy-emissive dopant to emit the curing energy. As illustrated in FIG. 5, for example, activating energy 57 may be applied by an activating energy source 58 and, as indicated in an illustration enlargement, may activate energy-emissive dopant 22 to emit curing energy 59 to provide dopant-activated non-reactive matrix component 60. Method 50 includes mixing 62 the dopant-activated non-reactive matrix component 60 and the resin 54 to form matrix material 20. Method 50 includes dispensing 64 an additive manufacturing fiber tow, a matrix material, and an energy-emissive dopant, which together may form a solidifiable elongate additive manufacturing fiber composite 65. Dispensing 64 an additive manufacturing fiber tow, a matrix material, and an energy-emissive dopant may include dispensing additive manufacturing fiber tow 12 and matrix material 20 (with the dopant-activated non-reactive matrix component 60) concurrently or successively. Method 50 may optionally include applying 66 activating energy to the energy-emissive dopant, included with manufacturing fiber tow 12 and matrix material 20, further to activate the energy-emissive dopant to emit the curing energy. As illustrated in FIG. 5, for example, activating energy 67 may be applied by an activating energy source 68 and, as indicated in an illustration enlargement, may activate energy-emissive dopant 22 to emit curing energy 69 to provide dopant-activated non-reactive matrix component 60. In some examples, activating energy sources 58 and 68 may be the same energy source, and in other examples activating energy sources 58 and 68 may be separate energy sources and may have different intensities, wavelengths/energies, or other characteristics.

In examples, applying 56 activating energy 57 to the energy-emissive dopant 22 and applying 66 activating energy 67 to the energy-emissive dopant may correspond to first and second applications of activating energy. In some examples, the energy-emissive dopant 22 may emit the curing energy 59, 69 while receiving the activating energy 57, 67 and in other examples the energy-emissive dopant 22 may also continue to emit the curing energy 59, 69 subsequent to application of the activating energy 57, 67. Energy-emissive dopant 22 that emits the curing energy 59, 69 while receiving the activating energy 57, 67, and in some examples only while receiving the activating energy 57, 67, may be referred to as fluorescent. Energy-emissive dopant 22 that continues to emit the curing energy 59, 69 subsequent to receiving the activating energy 57, 67 may be referred to as phosphorescent. In some examples, energy-emissive dopant 22 that continues to emit the curing energy 59, 69 subsequent to receiving the activating energy 57, 67 may emit or release the curing energy 59, 69 over time and may provide a timed delay to curing of the matrix material 20. As examples, Table 1 lists as example phosphorescent materials $SrHfO_3$:Ce, $YTaO_4$:Nb, $CaWO_4$, and LaOBr:Tb, which may continue to emit curing energies over persistence times ranging from about 40 ns to several hours.

Figure 6:
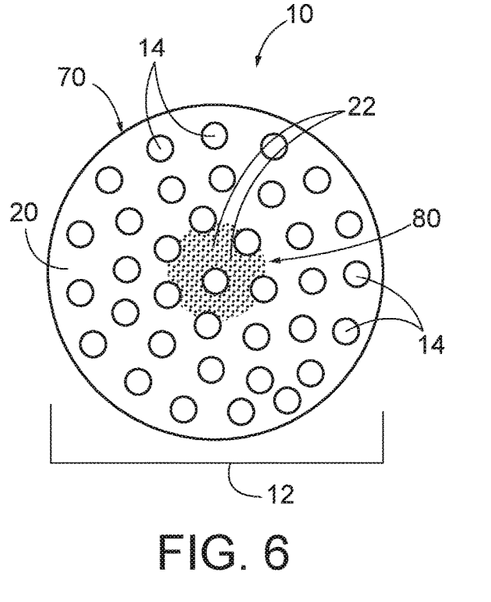
FIG. 6 illustrates a cross-sectional view of a first distribution of energy-emissive dopant in a first example elongate additive manufacturing fiber composite.

FIGS. 6-9 illustrate cross-sectional views of respective examples of elongate additive manufacturing fiber composite 10, each of which includes additive manufacturing fiber tow 12 of multiple elongate fibers 14, matrix material 20, and energy-emissive dopant 22. FIG. 6 illustrates example 70 of elongate additive manufacturing fiber composite 10, in which energy-emissive dopant 22 is in a distribution 80 that is positioned and/or distributed centrally, or at about a center region of elongate additive manufacturing fiber composite 10. Distribution 80 of energy-emissive dopant 22 may be employed, for example, to overcome or address shadowing that may arise in a central and/or center region of elongate additive manufacturing fiber composite 10 from multiple elongate fibers 14 of additive manufacturing fiber tow 12.

Figure 7:
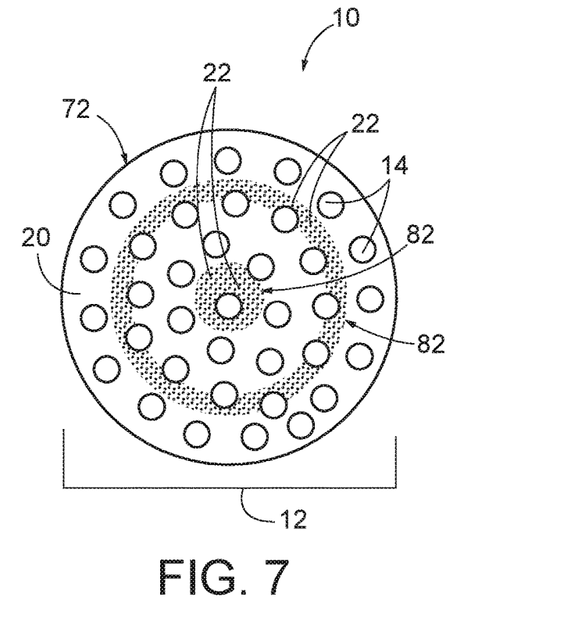
FIG. 7 illustrates a cross-sectional view of a second distribution of energy-emissive dopant in a second example elongate additive manufacturing fiber composite.

FIG. 7 illustrates example 72 of elongate additive manufacturing fiber composite 10, in which energy-emissive dopant 22 is in a distribution 82 that is positioned and/or distributed in one or more (e.g., two) concentric arrangements within elongate additive manufacturing fiber composite 10. Distribution 82 of energy-emissive dopant 22 may employ, for example, different dopants and/or different concentrations of dopant in the concentric arrangements to promote curing and/or stiffness of the elongate additive manufacturing fiber composite 10 after curing.

Figure 8:
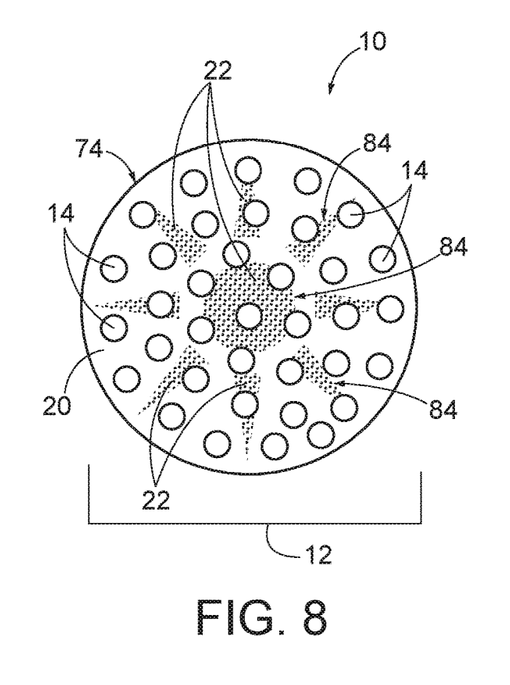
FIG. 8 illustrates a cross-sectional view of a third distribution of energy-emissive dopant in a third example elongate additive manufacturing fiber composite.

FIG. 8 illustrates example 74 of elongate additive manufacturing fiber composite 10, in which energy-emissive dopant 22 is in a distribution 84 that is positioned and/or distributed in multiple radial arrangements within elongate additive manufacturing fiber composite 10, and optionally also with includes energy-emissive dopant 22 positioned and/or distributed centrally, or at about a center region. Distribution 84 of energy-emissive dopant 22 may promote curing of and/or adhesion between successive or adjacent layers and/or courses of elongate additive manufacturing fiber composite 10, which may promote intermingling between layers and/or courses of the elongate additive manufacturing fiber composite 10.

Figure 9:
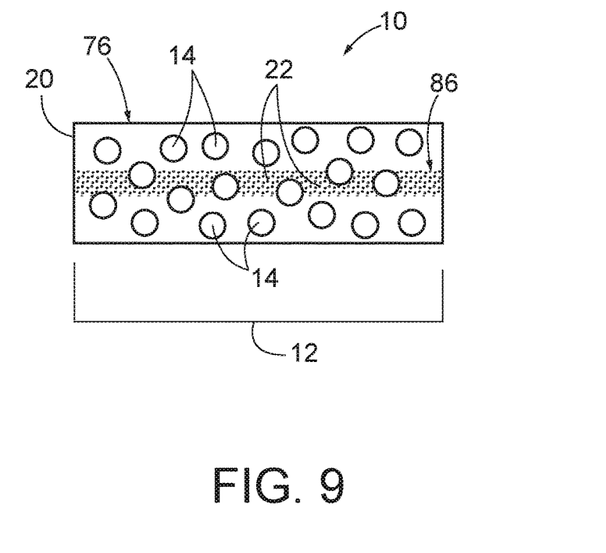
FIG. 9 illustrates a cross-sectional view of a fourth distribution of energy-emissive dopant in a fourth example elongate additive manufacturing fiber composite.

FIG. 9 illustrates example 76 of elongate additive manufacturing fiber composite 10, with a generally flat configuration, in which energy-emissive dopant 22 is in a distribution 86 that is positioned and/or distributed along a central plane or planar region of elongate additive manufacturing fiber composite 10. Distribution 86 of energy-emissive dopant 22 may be employed, for example, to overcome or address shadowing that may arise in a central and/or center region of a generally flat elongate additive manufacturing fiber composite 10 from the multiple elongate fibers 14 of additive manufacturing fiber tow 12. It will be appreciated that distributions 80, 82, 84, and 86 of respective examples 70, 72, 74, and 76 are illustrative and that energy-emissive dopant 22 may be positioned and/or distributed in many other arrangements, including a uniform distribution throughout matrix material 20, in accordance with the scope of this disclosure.

Figure 10:
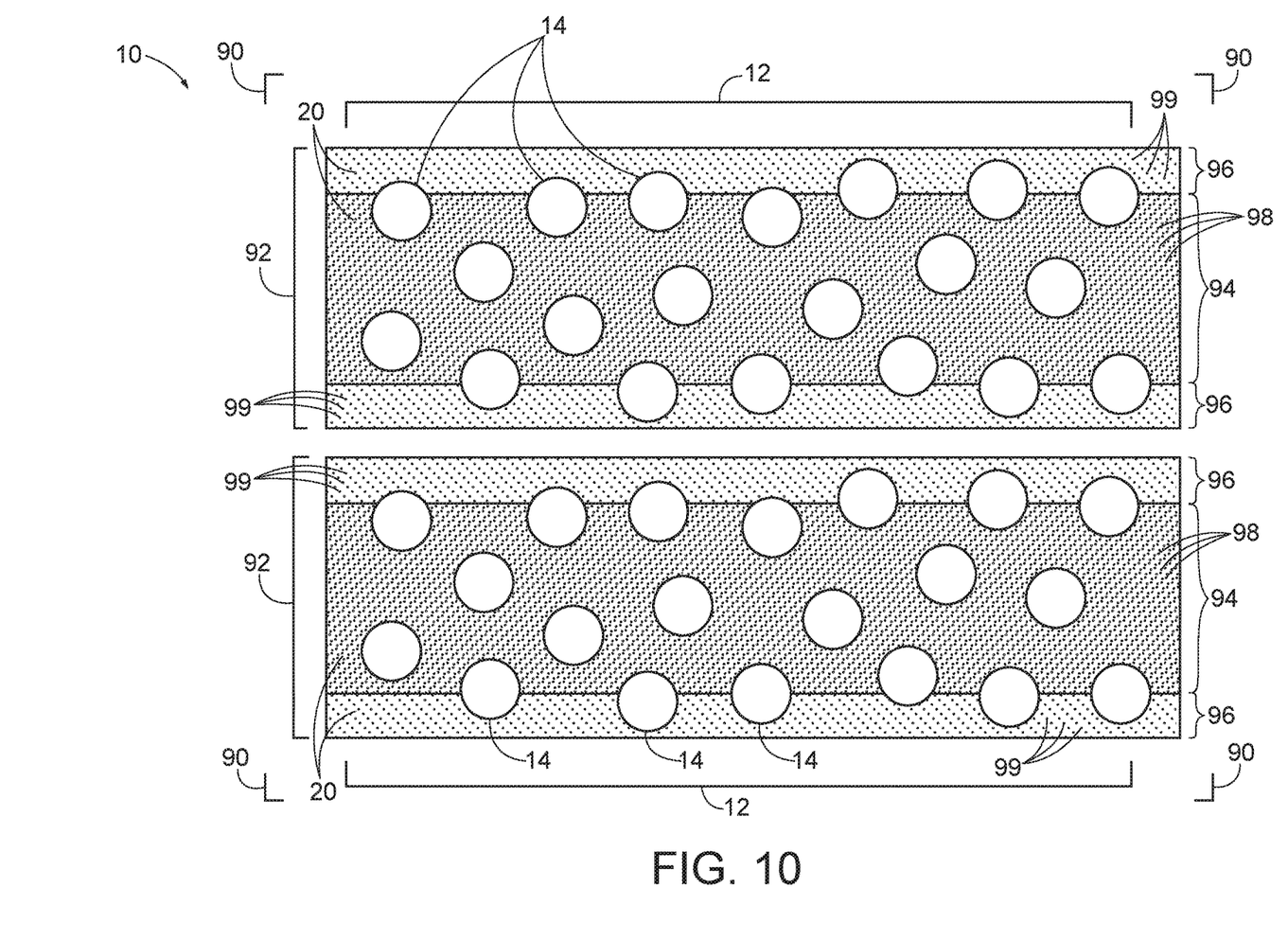
FIG. 10 illustrates an example of multiple courses or layers of elongate additive manufacturing fiber composite.

FIG. 10 illustrates example 90 of multiple courses or layers 92 (e.g., two) of elongate additive manufacturing fiber composite 10, with a generally flat configuration, which each include additive manufacturing fiber tow 12 of multiple elongate fibers 14, matrix material 20, and distributions 94 and 96 of respective energy-emissive dopants 98 and 99, that together may be referred to as an energy-emissive dopant 22. Energy-emissive dopants 98 and 99 may extend through generally planar regions of example 90 of elongate additive manufacturing fiber composite 10, with energy-emissive dopant 98 extending through a generally central planar region and energy-emissive dopant 99 extending through opposed outer or facial planar regions example 90 of elongate additive manufacturing fiber composite 10. Energy-emissive dopants 98 and 99 may be generally analogous, in emitting curing energy in response to receiving activating energy, but may emit energy in different manners, such as at different rates and/or at different energies. In some examples, energy-emissive dopant 98 extending through the generally central planar region may emit curing energy at a higher rate than that of energy-emissive dopant 98, to provide improved inter-laminar bonding. For example, two or more energy-emissive dopants that provide different curing rates may facilitate or improve inter-laminar bonding if a first layer cures at a lower rate while a second layer is being applied, thereby allowing the second layer to be applied before the first layer is cured. Timing issues with inter-laminar bonding can be significant in forming large-scale composites. In other examples, a first dopant may emit an energy, in response to an external activating energy, that may function as an internal activating energy to activate a second dopant to emit a curing energy. It will be appreciated that many combinations of two or more dopants that emit energy in two or more manners may be used together. Moreover, it will be appreciated that arbitrary numbers of courses or layers of elongate additive manufacturing fiber composite 10 may be used in any configuration and that such elongate additive manufacturing fiber composite 10 may be of any cross-sectional shape or configuration.

Example 90 of FIG. 10 illustrates courses or layers 92 with respective elongate fibers 14 that may be generally parallel to each other. It will be appreciated, however, that other examples may include more than two courses or layers 92, and the elongate fibers 14 of respective courses or layers 92 may be aligned in different directions. For example, successive courses or layers 92, or successive groups of courses or layers 92, may have respective elongate fibers 14 that are transverse (e.g., perpendicular) to each other. In other examples, different courses or layers 92, or different groups of courses or layers 92, may have any orientation, according to design or performance considerations.

Figure 11:
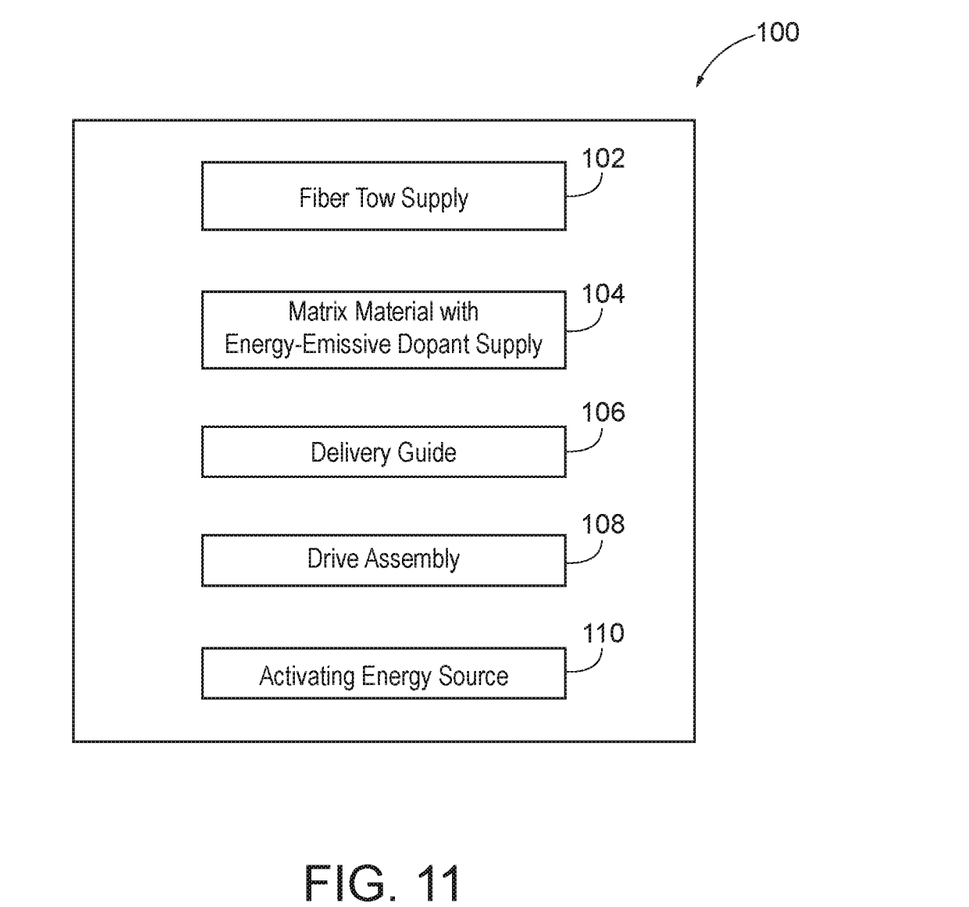
FIG. 11 is a schematic illustration representing a system for additive manufacturing that utilize multi-part filaments.

FIG. 11 is a block diagram of a system 100 for additively manufacturing an article. System 100 includes a supply 102 of the additive manufacturing fiber tow 12, and a supply 104 of matrix material 20 with energy-emissive dopant 22. A delivery guide 106 is positioned to receive the additive manufacturing fiber tow from the supply 102 and the matrix material 20 with energy-emissive dopant 22 from the supply 104 and is configured to dispense them as a solidifiable elongate additive manufacturing fiber composite, such as solidifiable elongate additive manufacturing fiber composite 33 (FIG. 3) or 65 (FIG. 5), for example. A drive assembly 108 is operatively coupled to the delivery guide 106 and configured to selectively move the delivery guide 106 in two- or three-dimensions to additively form the solidifiable elongate additive manufacturing fiber composite in an article configuration. Delivery guide 106 and/or drive assembly 108 may be referred to as a composite dispenser. The solidifiable elongate additive manufacturing fiber composite in the article configuration may refer to the solidifiable elongate additive manufacturing fiber composite at any time after being dispensed, including immediately after any portion of the solidifiable elongate additive manufacturing fiber composite is dispensed in the article configuration, or after the article is completely formed by the solidifiable elongate additive manufacturing fiber composite, or any time therebetween.

System 100 further includes an activating energy source 110 that applies activating energy to the energy-emissive dopant to activate the energy-emissive dopant to emit the curing energy to effect curing of the matrix material to manufacture the article. As examples, activating energy source 110 may correspond or be analogous to activating energy source 36 (FIG. 3) and/or activating energy sources 58 and/or 68 (FIG. 5) and may provide at least any of the activating or excitation energies listed in Table 1.

Figures 12, 13:
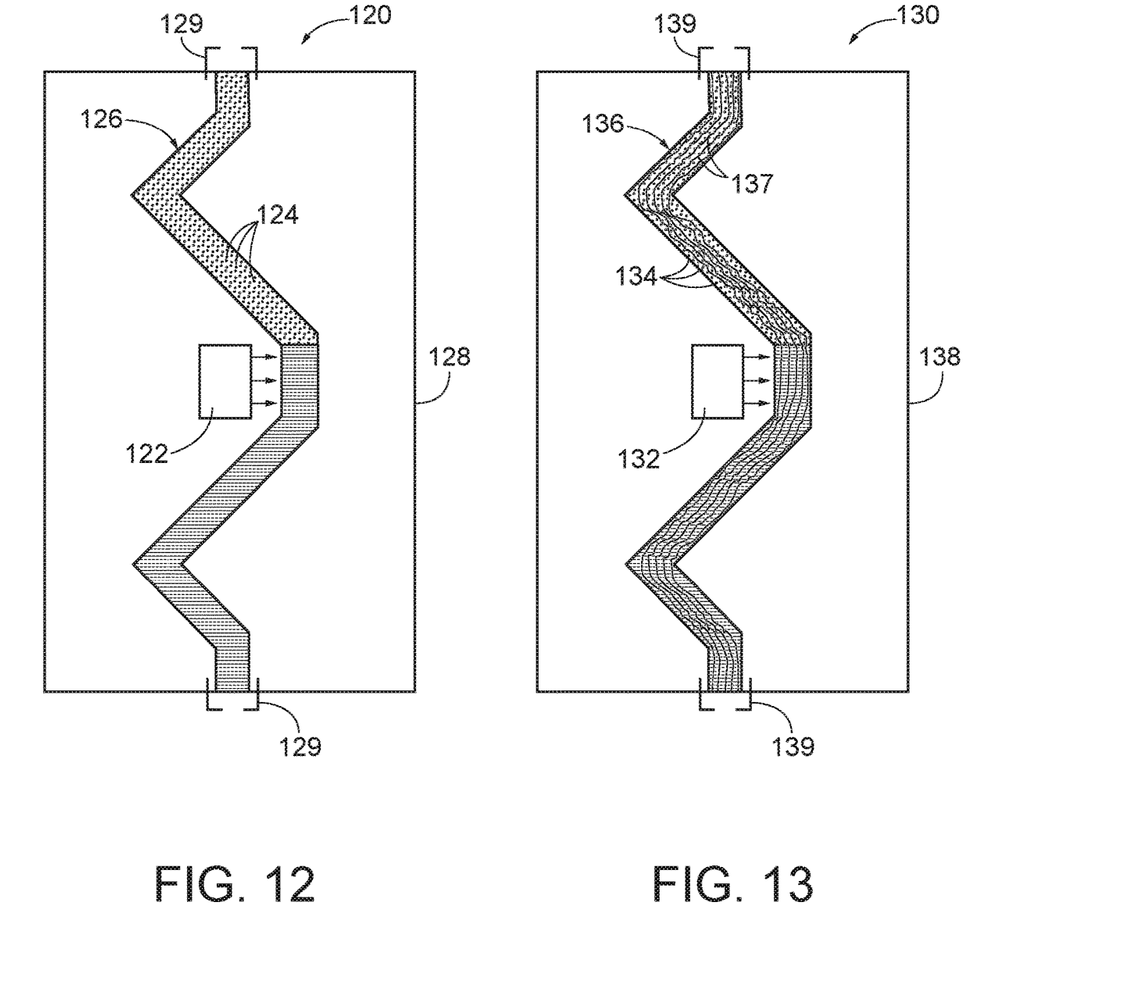
FIG. 12 illustrates a schematic cross-sectional view of a first system with a high-energy activating energy source to activate an energy-emissive dopant.
FIG. 13 illustrates a schematic cross-sectional view of a second system with a high-energy activating energy source to activate an energy-emissive dopant.

As described above, some examples of the activating energy may be or include a penetrating and/or an ionizing activating energy, such as x-rays or gamma rays. Activating energy source 110 of system 100 (FIG. 11) may provide such activating energies, which may be referred to as high-energy activating energies. In connection with applying such high-energy activating energies, FIGS. 12 and 13 illustrate schematic cross-sectional views of example high-energy activating systems 120 and 130 that may be employed with and/or incorporated into system 100. Activating systems 120 and 130 include high-energy activating energy sources 122 and 132 (e.g., gamma radiation sources), as examples of activating energy source 110, to activate energy-emissive dopants 124 and 134, respectively.

In high-energy activating system 120, energy-emissive dopant 124 may be included with a non-reactive matrix component 126, in a manner similar to that described with reference to FIG. 5. In high-energy activating system 130, energy-emissive dopant 134 may be included with a matrix material 136 and a fiber tow 137, in a manner similar to that described with reference to FIG. 3. High-energy activating energy sources 122 and 132, emitting gamma radiation, may be considered to be emitting ionizing and or penetrating energy. High-energy activating systems 120 and 130 include radiation shielding 128 and 138 to minimize extraneous transmission of ionizing and or penetrating energy for safety purposes. In addition, systems 120 and 130 may include meander pathways 129 and 139 further to minimize extraneous transmission of ionizing and or penetrating energy. For example, energy-emissive dopant 124 and non-reactive matrix component 126 may be carried along meander pathway 129 past high-energy activating energy sources 122, and energy-emissive dopant 134 with matrix material 136 and a fiber tow 137 may be carried along meander pathway 139 past high-energy activating energy sources 132. It will be appreciated that in other examples high-energy activating energy sources 122 and 132 may generate other high-energy activating energies, such as x-ray radiation.

Illustrative, non-exclusive examples of inventive subject matter according to the present disclosure are described in the following enumerated paragraphs:

A. A method of additively manufacturing an article, comprising:

dispensing an additive manufacturing fiber tow, a solidifiable matrix material, and an energy-emissive dopant, wherein the energy-emissive dopant emits a curing energy in response to receiving an activating energy, and the curing energy effects curing of the solidifiable matrix material; and applying activating energy to the energy-emissive dopant to activate the energy-emissive dopant to emit the curing energy.

A1. The method of paragraph A, wherein dispensing the additive manufacturing fiber tow, the solidifiable matrix material, and the energy-emissive dopant includes arranging the additive manufacturing fiber tow in an article configuration with the solidifiable matrix material and the energy-emissive dopant.

A2. The method of paragraph A1, wherein applying the activating energy to the energy-emissive dopant includes applying the activating energy to the energy-emissive dopant with the additive manufacturing fiber tow and the solidifiable matrix material in the article configuration.

A3. The method of paragraph A, wherein applying the activating energy to the energy-emissive dopant includes applying the activating energy to the energy-emissive dopant without the additive manufacturing fiber tow.

A4. The method of any of paragraphs A-A3, wherein the energy-emissive dopant emits the curing energy while receiving the activating energy.

A5. The method of any paragraphs A-A3, wherein the energy-emissive dopant continues to emit the curing energy subsequent to application of the activating energy.

A6. The method of any of paragraphs A-A5, wherein the solidifiable matrix material includes a non-reactive matrix component and a resin and the energy-emissive dopant is included in the non-reactive matrix component, wherein the method further comprises mixing the resin with the non-reactive matrix component and the energy-emissive dopant, and wherein dispensing the additive manufacturing fiber tow, the solidifiable matrix material, and the energy-emissive dopant includes applying the solidifiable matrix material and the energy-emissive dopant to the additive manufacturing fiber tow.

A7. The method of any of paragraphs A-A6, wherein the curing energy and the activating energy are different.

A8. The method of paragraph A6, wherein the activating energy is of a penetrating energy to penetrate the additive manufacturing fiber tow and the solidifiable matrix material to activate the energy-emissive dopant.

A9. The method of paragraph A6, wherein the activating energy includes ionizing radiation to penetrate the additive manufacturing fiber tow and the solidifiable matrix material to activate the energy-emissive dopant.

A10. The method of paragraph A9, wherein the activating energy includes gamma radiation.

A11. The method of paragraph A9, wherein the activating energy includes x-ray radiation.

A12. The method of any of paragraphs A-A11, wherein the energy-emissive dopant includes nanoparticles.

A13. The method of any of paragraphs A-A11, wherein the energy-emissive dopant is configured as nanoparticles.

A14. The method of any of paragraphs A-A13, wherein the additive manufacturing fiber tow with the solidifiable matrix material and the energy-emissive dopant that emits a curing energy correspond to a first additive manufacturing fiber tow with a first solidifiable matrix material and a first energy-emissive dopant that emits a first curing energy, respectively, wherein the first curing energy effects curing of the first solidifiable matrix material at a first cure rate, and wherein the method further comprises dispensing a second additive manufacturing fiber tow on the first additive manufacturing fiber tow with a second solidifiable matrix material and a second energy-emissive dopant, wherein the second energy-emissive dopant emits a second curing energy in response to receiving the activating energy, and the second curing energy effects curing of the second solidifiable matrix material at a second cure rate that is different than the first cure rate.

A15. An article manufactured according to the method of any of paragraphs A-A14.

B. An additive manufacturing system, comprising:

a supply of additive manufacturing fiber tow;

a fiber tow dispenser to dispense the additive manufacturing fiber tow;

a supply of solidifiable matrix material with an energy-emissive dopant that emits a curing energy in response to receiving an activating energy, wherein the curing energy effects curing of the solidifiable matrix material;

a composite dispenser to dispense the additive manufacturing fiber tow with the solidifiable matrix material; and an activating energy source to apply activating energy to the energy-emissive dopant to activate the energy-emissive dopant to emit the curing energy.

B1. The system of paragraph B, wherein the activating energy source includes a first activating energy source configured to apply activating energy to the energy-emissive dopant separate from the additive manufacturing fiber tow and prior to the solidifiable matrix material being dispensed with the additive manufacturing fiber.

B2. The system of paragraph B or B1, wherein the activating energy source includes a second activating energy source configured to apply activating energy to the energy-emissive dopant after the solidifiable matrix material is dispensed with the additive manufacturing fiber.

B3. The system of any of paragraphs B-B2, wherein the solidifiable matrix material includes a non-reactive matrix component and a resin and the energy-emissive dopant is included in the non-reactive matrix component, and wherein the system further comprises a mixer to mix the resin with the non-reactive matrix component and the energy-emissive dopant as a mixture and to dispense the mixture with additive manufacturing fiber tow.

B4. The system of paragraph B1, wherein the solidifiable matrix material includes an non-reactive matrix component and a resin and the energy-emissive dopant is included in the non-reactive matrix component, wherein the system further comprises a mixer to mix the resin with the non-reactive matrix component and the energy-emissive dopant as a mixture and to deliver the mixture to the composite dispenser, and wherein the first activating energy source is configured to apply activating energy to the energy-emissive dopant in the non-reactive matrix component prior to the mixer mixing the resin with the non-reactive matrix component and the energy-emissive dopant.

B5. The system of any of paragraphs B-B4, wherein the curing energy and the activating energy are different.

B6. The system of any of paragraphs B-B5, wherein the activating energy source applies activating energy that includes ionizing radiation.

B7. The system of paragraph B6, wherein the activating energy includes gamma radiation.

B8. The system of paragraph B6, wherein the activating energy includes x-ray radiation.

B9. The system of any of paragraphs B-B8, wherein the energy-emissive dopant includes nanoparticles.

B10. The system of any of paragraphs B-B8, wherein the energy-emissive dopant is configured as nanoparticles.

B11. The use of the system of any of paragraphs B-B10 to additively manufacture an article.

C. An article, comprising:
one or more courses of additive manufacturing fiber tow; and
a solidified matrix material with an energy-emissive dopant applied to each course, wherein the energy-emissive dopant emits a curing energy in response to receiving an activating energy to effect curing of the solidified matrix material.

C1. The article of paragraph C, wherein the activating energy includes ionizing energy.

C2. The article of paragraph C or C1, wherein the solidified matrix material includes a resin. C3. The article of any of paragraphs C-C2, wherein the solidified matrix material includes a non-reactive matrix component.

C4. The article of any of paragraphs C-C3, wherein the energy-emissive dopant includes nanoparticles.

C5. The article of any of paragraphs C-C3, wherein the energy-emissive dopant is configured as nanoparticles.

C6. The article of any of paragraphs C-C5, wherein the energy-emissive dopant includes a first energy-emissive dopant that emits a curing energy in a first manner, and wherein the solidified matrix material of at least one of the one or more courses of additive manufacturing fiber tow further includes a second energy-emissive dopant that emits the curing energy in a second manner that is different from the first manner.

D. An elongate additive manufacturing fiber composite, comprising:
multiple elongate fibers; and
a matrix material that encompasses the elongate fibers, the matrix material including an energy-emissive dopant that emits a curing energy in response to receiving an activating energy to effect curing of the matrix material.

D1. The elongate additive manufacturing fiber composite of paragraph D, wherein the energy-emissive dopant includes nanoparticles.

D2. The elongate additive manufacturing fiber composite of paragraph D, wherein the energy-emissive dopant is configured as nanoparticles.

D3. The elongate additive manufacturing fiber composite of any of paragraphs D-D2, wherein the energy-emissive dopant emits the curing energy while receiving the activating energy.

D4. The elongate additive manufacturing fiber composite of any of paragraphs D-D2, wherein the energy-emissive dopant continues to emit the curing energy subsequent to application of the activating energy.

D5. The elongate additive manufacturing fiber composite of any of paragraphs D-D5, wherein the matrix material includes a photopolymer that is configured to be cured in the presence of light of the curing energy.

D6. The elongate additive manufacturing fiber composite of any of paragraphs D-D5, wherein the energy-emissive dopant includes a first energy-emissive dopant that emits a curing energy in a first manner, and wherein the matrix material further includes a second energy-emissive dopant that emits the curing energy in a second manner than is different from the first manner.

D7. The elongate additive manufacturing fiber composite of any of paragraphs D-D6, wherein the elongate additive manufacturing fiber composite includes a pre-impregnated composite stock.

D8. The use of the elongate additive manufacturing fiber composite of any of paragraphs D-D7 to additively manufacture an article.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A method of additively manufacturing an article, comprising:
dispensing an additive manufacturing fiber tow, a photopolymer matrix material, and an energy-emissive dopant, wherein the energy-emissive dopant emits a curing energy in response to receiving an activating energy, and the curing energy effects curing of the photopolymer matrix material; and
applying the activating energy to the energy-emissive dopant to activate the energy-emissive dopant to emit the curing energy, wherein the activating energy is different than the curing energy and penetrates the additive manufacturing fiber tow.

2. The method of claim 1, wherein dispensing the additive manufacturing fiber tow, the photopolymer matrix material, and the energy-emissive dopant includes arranging the additive manufacturing fiber tow in an article configuration with the photopolymer matrix material and the energy-emissive dopant.

3. The method of claim 2, wherein applying the activating energy to the energy-emissive dopant includes applying the activating energy to the energy-emissive dopant with the additive manufacturing fiber tow and the photopolymer matrix material in the article configuration.

4. The method of claim 1, wherein applying the activating energy to the energy-emissive dopant includes applying the activating energy to the energy-emissive dopant without the additive manufacturing fiber tow.

5. The method of claim 1, wherein the photopolymer matrix material includes a non-reactive matrix component and a resin and the energy-emissive dopant is included in the non-reactive matrix component, wherein the method further comprises mixing the resin with the non-reactive matrix component and the energy-emissive dopant, and wherein dispensing the additive manufacturing fiber tow, the photopolymer matrix material, and the energy-emissive dopant includes applying the photopolymer matrix material and the energy-emissive dopant to the additive manufacturing fiber tow.

6. The method of claim 1, wherein the activating energy includes x-ray radiation.

7. The method of claim 1, wherein the energy-emissive dopant includes nanoparticles.

8. The method of claim 1, wherein the energy-emissive dopant emits the curing energy while receiving the activating energy.

9. The method of claim 1, wherein the energy-emissive dopant continues to emit the curing energy subsequent to application of the activating energy.

10. The method of claim 1, wherein the activating energy includes ionizing radiation to penetrate the additive manufacturing fiber tow and the photopolymer matrix material to activate the energy-emissive dopant.

11. The method of claim 1, wherein the additive manufacturing fiber tow with the photopolymer matrix material and the energy-emissive dopant that emits the curing energy correspond to a first additive manufacturing fiber tow with a first solidifiable matrix material and a first energy-emissive dopant that emits a first curing energy, respectively, wherein the first curing energy effects curing of the first solidifiable matrix material at a first cure rate, and wherein the method further comprises dispensing a second additive manufacturing fiber tow on the first additive manufacturing fiber tow with a second solidifiable matrix material and a second energy-emissive dopant, wherein the second energy-emissive dopant emits a second curing energy in response to receiving the activating energy, and the second curing energy effects curing of the second solidifiable matrix material at a second cure rate that is different than the first cure rate.

12. The method of claim 1, wherein dispensing the additive manufacturing fiber tow, the photopolymer matrix material, and the energy-emissive dopant includes dispensing the additive manufacturing fiber tow, the photopolymer matrix material, and the energy-emissive dopant as an elongate additive manufacturing fiber composite, in which the energy-emissive dopant is distributed only within a center region of the elongate additive manufacturing fiber composite.

13. The method of claim 1, wherein dispensing the additive manufacturing fiber tow, the photopolymer matrix material, and the energy-emissive dopant includes dispensing the additive manufacturing fiber tow, the photopolymer matrix material, and the energy-emissive dopant as an elongate additive manufacturing fiber composite, in which the energy-emissive dopant is distributed in one or more concentric arrangements within the elongate additive manufacturing fiber composite.

14. The method of claim 1, wherein dispensing the additive manufacturing fiber tow, the photopolymer matrix material, and the energy-emissive dopant includes dispensing the additive manufacturing fiber tow, the photopolymer matrix material, and the energy-emissive dopant as an elongate additive manufacturing fiber composite, in which the energy-emissive dopant is distributed in multiple radial arrangements within the elongate additive manufacturing fiber composite.

15. The method of claim 1, wherein dispensing the additive manufacturing fiber tow, the photopolymer matrix material, and the energy-emissive dopant includes dispensing the additive manufacturing fiber tow, the photopolymer matrix material, and the energy-emissive dopant as an elongate additive manufacturing fiber composite with a flat configuration, in which the energy-emissive dopant is distributed in a central planar region of the elongate additive manufacturing fiber composite.

16. A method of additively manufacturing an article, comprising:
dispensing a solidifiable elongate additive manufacturing fiber composite comprising a photopolymer matrix material, an additive manufacturing fiber tow within the photopolymer matrix material, a first distribution of a first energy-emissive dopant within the photopolymer matrix material, and a second distribution of a second energy-emissive dopant within the photopolymer matrix material, wherein the first energy-emissive dopant and the second energy-emissive dopant emit a curing energy in response to receiving an activating energy, wherein the curing energy effects curing of the photopolymer matrix material, wherein the activating energy is different than the curing energy and penetrates the additive manufacturing fiber tow, and wherein the first energy-emissive dopant and the second energy-emissive dopant emit the curing energy at different rates; and applying the activating energy to the first energy-emissive dopant and to the second energy-emissive dopant to activate the first energy-emissive dopant and the second energy-emissive dopant to emit the curing energy.

17. The method of claim 16, wherein the first distribution is within an outer region of the solidifiable elongate additive manufacturing fiber composite, wherein the second distribution is within a central region of the solidifiable elongate additive manufacturing fiber composite, and wherein the second energy-emissive dopant emits the curing energy at a higher rate than the first energy-emissive dopant.

18. The method of claim 16, wherein dispensing the solidifiable elongate additive manufacturing fiber composite includes arranging the solidifiable elongate additive manufacturing fiber composite in an article configuration.

19. The method of claim 18, wherein applying the activating energy includes applying the activating energy to the first energy-emissive dopant and to the second energy-emissive dopant with the solidifiable elongate additive manufacturing fiber composite in the article configuration.

20. The method of claim 16, wherein applying the activating energy includes applying the activating energy to the first energy-emissive dopant and to the second energy-emissive dopant prior to dispensing the solidifiable elongate additive manufacturing fiber composite.

* * * * *

UNITED STATES PATENT AND TRADEMARK OFFICE
CERTIFICATE OF CORRECTION

PATENT NO. : 10,766,195 B2
APPLICATION NO. : 15/726283
DATED : September 8, 2020
INVENTOR(S) : Michael Patrick Kozar, Mark Stewart Wilenski and Samuel F. Harrison Page 1 of 1

It is certified that error appears in the above-identified patent and that said Letters Patent is hereby corrected as shown below:

In the Claims

Claim 16, Column 14, Line 59, remove "photopolvmer" and insert --photopolymer--
Claim 16, Column 14, Line 61, remove "photopolvmer" and insert --photopolymer--
Claim 16, Column 14, Line 62, remove "photopolvmer" and insert --photopolymer--
Claim 16, Column 14, Line 64, remove "photopolvmer" and insert --photopolymer--
Claim 16, Column 15, Line 2, remove "photopolvmer" and insert --photopolymer--

Signed and Sealed this
Eighth Day of December, 2020

Andrei Iancu
*Director of the United States Patent and Trademark Office*